May 21, 1963 W. F. McCANN 3,090,331
PALLET
Filed Jan. 5, 1962 4 Sheets-Sheet 1
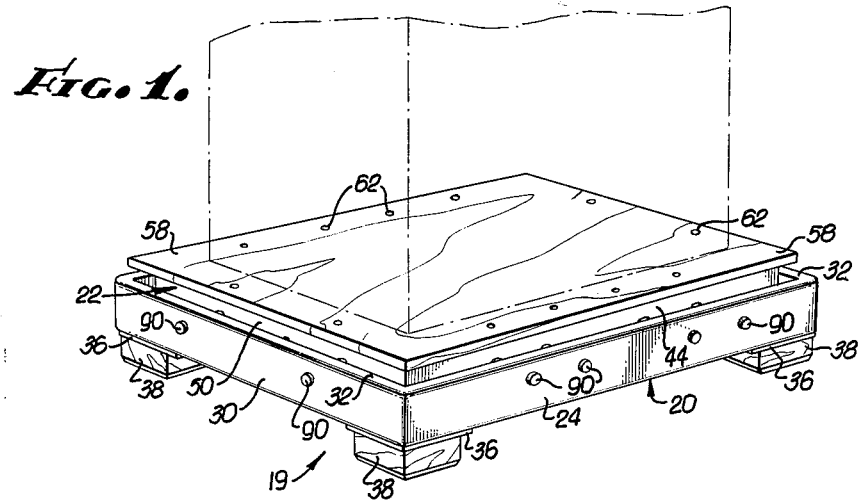
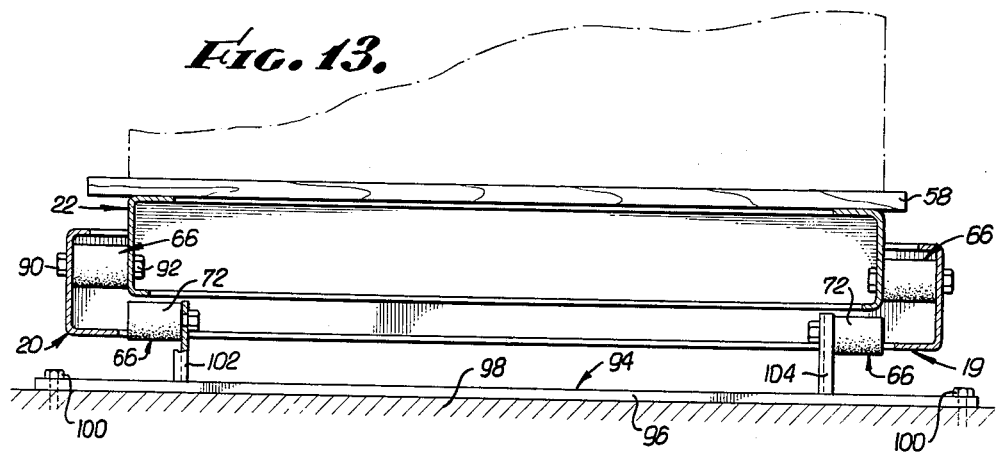
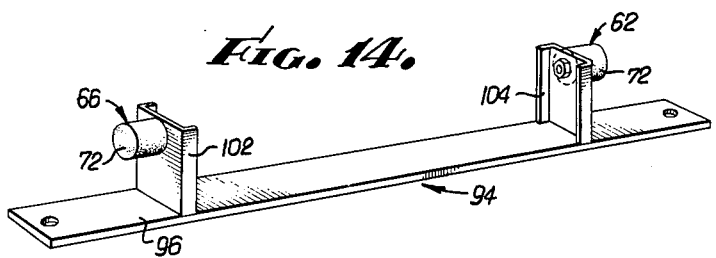
INVENTOR.
WILLIAM F. McCANN
BY
Huebner & Worrel
ATTORNEYS.

May 21, 1963 W. F. McCANN 3,090,331
PALLET
Filed Jan. 5, 1962 4 Sheets-Sheet 2

INVENTOR.
WILLIAM F. McCANN
BY
Huebner & Worrel
ATTORNEYS.

May 21, 1963
W. F. McCANN
3,090,331
PALLET
Filed Jan. 5, 1962
4 Sheets-Sheet 3
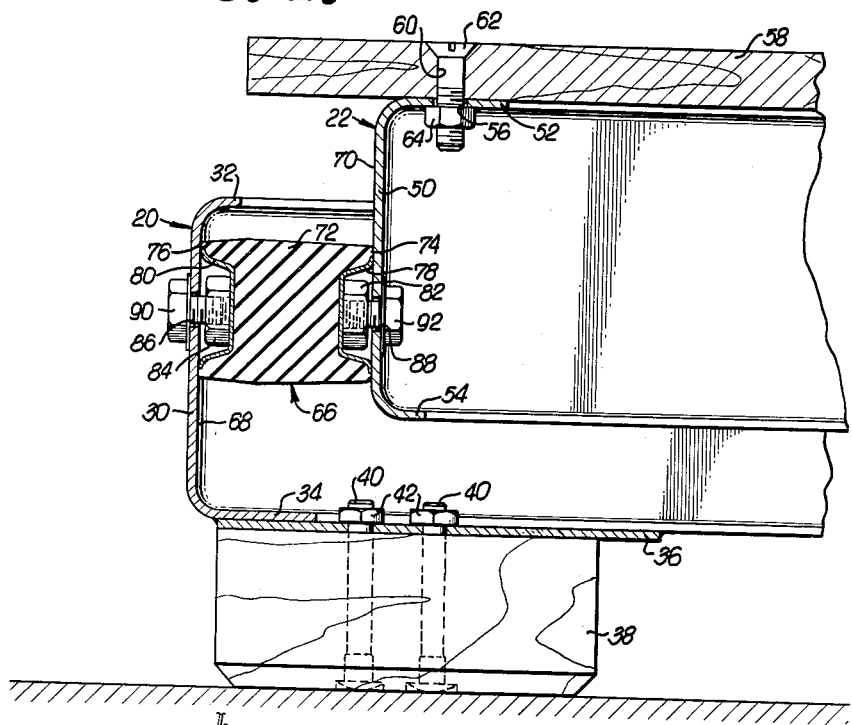
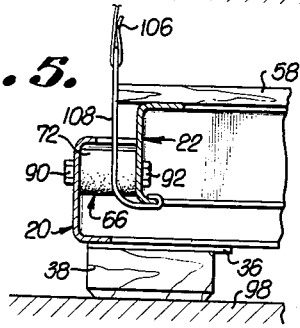
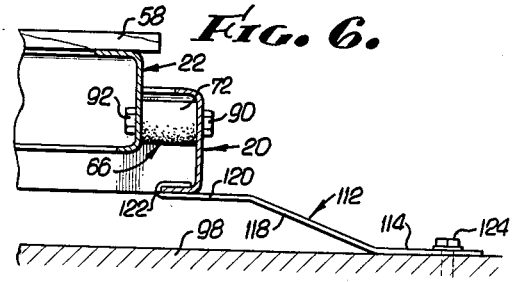
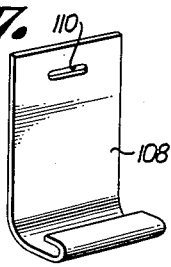
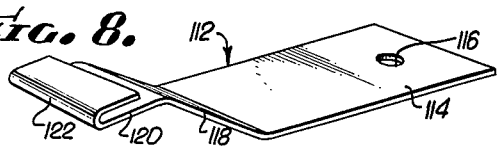
INVENTOR.
WILLIAM F. McCANN
BY
Huebner & Worrel
ATTORNEYS.

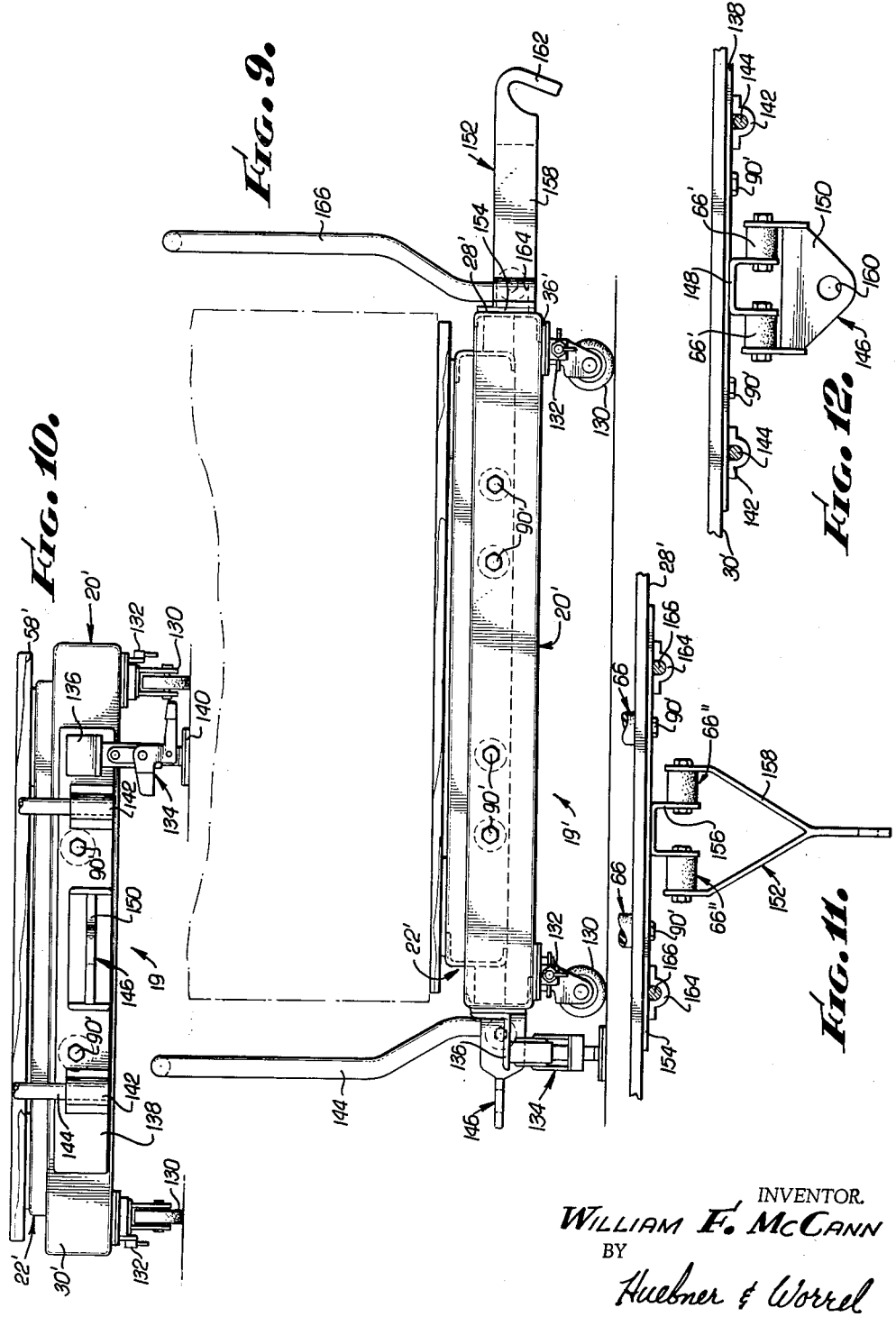

3,090,331
PALLET
William F. McCann, Van Nuys, Calif., assignor to Lyon Van & Storage Co., Los Angeles, Calif., a corporation of California
Filed Jan. 5, 1962, Ser. No. 164,462
6 Claims. (Cl. 108—51)

This invention relates to pallets and more particularly to pallets which suspend loads placed thereon and reduce shock and vibration during storage or transporting of the loads.

In the transportation and storage industry there has been great difficulty in the past in the preparation for storage and transportation of relatively fragile goods, such as electronic equipment, and other electrical equipment.

It has been found that in the storage and transportation of such equipment palletizing of this equipment has greatly increased the efficiency with which a load may be moved from one place to another for storage or from storage to a transportation medium. However, heretofore the palletizing of fragile equipment has encountered the difficulty of not adequately protecting this fragile equipment from undue shock and vibration, which has resulted in damage to the equipment.

Prior attempts have been made to relieve the undesirable shock and vibration of such fragile equipment by using padding around the equipment when it is mounted upon, a conventional pallet, but such padding has not been adequate to lessen damage to the load when the pallet itself may be dropped or unnecessarily shaken in view of the fact that the load of necessity must be directly affixed to the pallet. Thus any shock to the pallet will be transmitted through the padding and to the fragile load.

The present invention has reduced the shock and/or vibration which might be transferred to a fragile load on a pallet by providing a pallet which isolates the load on the pallet to the point where the load will withstand a great amount of shock and vibration without damage.

It is an object of this invention to provide a pallet which is adapted to support a load from excess shock and vibration and is particularly useful for supporting fragile equipment such as electronic apparatus.

Another object of this invention is to provide a pallet having shock absorbing characteristics wherein the pallet may be adjusted dependent upon the center of gravity of the load or other inertia characteristics of the load, such as an asymmetrical load, which is intended to be supported upon the pallet.

Another object of this invention is to provide a pallet having shock absorbing characteristics which may be transported by any conventional fork-lift equipment or may be mounted on casters for independent rolling movement.

A further object of this invention is to provide a pallet having shock absorbing characteristics where a part of the pallet is suspended for independent up and down movement within a fixed area.

An additional object of this invention is to provide a pallet having shock absorbing characteristics which incorporate novel coupling means for attaching a plurality of pallets with coasters affixed thereto to be transported by a conventional tractor.

A further object of this invention is to provide a pallet having shock absorbing characteristics which incorporate tie down means for securing the pallet to an underlying surface during transportation of the pallet.

An additional object of this invention is to provide a pallet having shock absorbing characteristics which are relatively inexpensive to manufacture, and easy to assemble.

Further objects and advantages of the invention will appear during the course of the following part of the specification, wherein the details of construction of embodiments thereof are described with reference to the accompanying drawings, in which:

FIGURE 1 is a perspective view of the pallet with a load indicated in broken lines mounted on said pallet;

FIGURE 4 is a detailed cross sectional view taken on line 4—4 of FIGURE 2 showing one of the shock mount means;

FIGURE 5 is an illustration of a strap and clip means for holding a load upon the pallet;

FIGURE 6 is a fragmentary cross sectional view of the pallet showing a tie down means;

FIGURE 7 is a perspective view of the clip means illustrated in FIGURE 5;

FIGURE 8 is a perspective view of the tie down means illustrated in FIGURE 6;

FIGURE 9 is a side elevational view of a modified form of the pallet illustrated in FIGURE 1 illustrating a pallet mounted upon casters and coupling means at each end of the pallet to couple additional pallets;

FIGURE 10 is an end view of the pallet illustrated in FIGURE 9 showing in greater detail one of the coupling means;

FIGURE 11 is a top elevational view of another of the coupling means illustrated in FIGURE 9;

FIGURE 12 is a top plan view of the coupling means illustrated in FIGURE 10;

FIGURE 13 is an illustration of snubber means which may be used with the pallet to reduce shock and vibration of a load mounted on the pallet; and FIGURE 14 is a detail perspective view of the snubber means illustrated in FIGURE 13.

Figure 2:
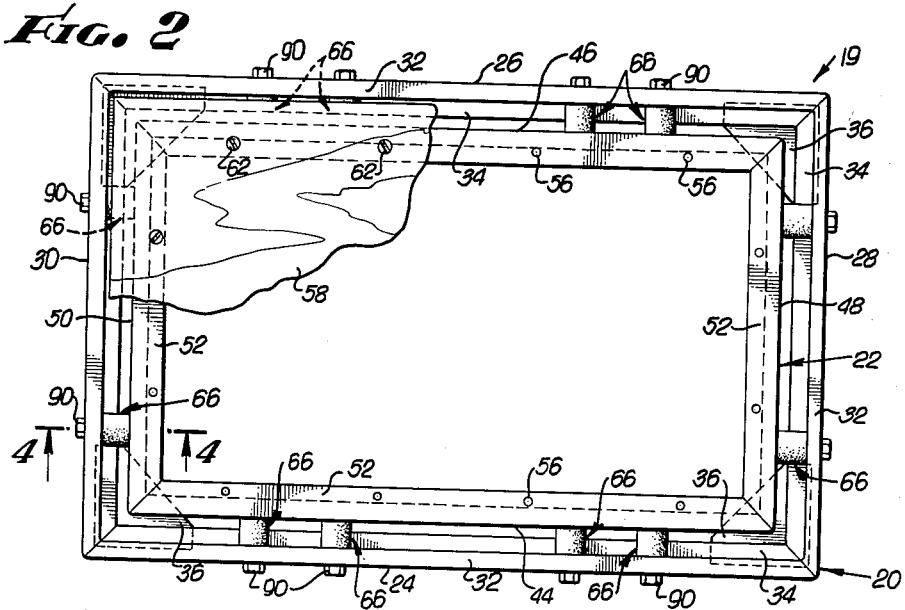
FIGURE 2 is a top plan view partially cut away of the pallet.

The pallet 19 consists generally of a base or outer frame 20 and a suspension or inner frame 22 mounted within the base frame 20.

The base frame 20 is rectangular or square in shape and formed of a channel member having pairs of parallel walls 24 and 26, 28 and 30. The respective walls 24, 26, 28 and 30 have an inturned upper flange 32 and an inturned lower flange 34. The flange 34 projects inwardly further than the flange 32, as best illustrated in FIGURE 4. Gussets 36 are welded or otherwise secured to the flange 34 at the corners where the respective walls 24, 26, 28 and 30 converge. These gussets 36 serve to reinforce the base frame 20 as well as serve as mounting plates for corner skid blocks or elevation means 38. The skid blocks 38 are secured to the gussets 36 by means of bolts 40 passing through the skid blocks 38 and gussets 36 which are threadably held to the gussets 38 by nuts 42. The skid blocks 38 are of sufficient height to allow forks of a conventional fork lift truck to pass underneath the outer frame 20.

The suspense or inner frame 22 is of a similar construction to the base frame 20, but of smaller perimeter, in that it is formed from a channel member into pairs of parallel walls 44 and 46, 48 and 50. The respective walls are formed with an inturned upper flange 52 and a lower inturned flange 54. The upper flange 52 generally projects inwardly further than the flange 54.

The flange 52 of the walls 44, 46, 48 and 50 are provided with a plurality of holes 56 extending therethrough and the flange 52 serves as a surface to secure a platform means 58. The platform means 58 is provided with a plurality of openings 60 which correspond with the openings 56 and bolts 62 pass through the platform 58 and opening 56 and the nuts 64 threadably secure the platform to the flange 52 of the inner frame 22. Generally, the platform 58 projects outward from the respective walls of the inner frame 22 to a point on a vertical line with the flanges 32 of the outer or base frame 20. The overhang of the platform 58 serves to increase the load area and also the projection will act as a shield to prevent the wedging of an object between the base frame 20 and suspense frame 22. While the platform 58 in its preferred form illustrated is a solid piece of wood, it should be realized that the platform does not have to be one piece but can be a series of wood or other material strips secured to the flange 52.

The suspense frame 22 is supported between the respective walls 24, 26, 28 and 30 of the base frame 20 by means of a plurality of shock or shear mount means generally designated 66 which are horizontally spaced between the interior surface 68 of the frame 20 and the exterior surface 70 of the interior frame 22. The mounting means 66 comprises a main roller body 72 which is circular in cross section of rubber or other elastic, resilient material having generally parallel ends 74 and 76. The ends 74 and 76 are dish shaped and fitted with sleeves 78 and 80, respectively. The sleeves 78 and 80 are formed with threaded nuts 82 and 84, respectively. The outer and inner frames 20 and 22 are each provided with openings 86 and 88 which are complementary to each other and adapted to receive threaded bolts 90 and 92, which are threadably secured in the nuts 82 and 84, respectively. It will be seen that the opening 88 in the inner frame 22 is formed closer to the flange 54 than the flange 52 and the opening 86 is formed closer to the flange 32 than the flange 34 in the base frame 20 so that when the respective openings are aligned and the shear mount means 66 positioned between the respective openings a portion of the suspense frame 22 will be elevated above the base frame 20. After all of the shear mount means 66 are positioned between the respective frames 20 and 22 the bolts 90 and 92 are tightened and the suspense frame 22 becomes suspended between the base frame 20.

In the preferred embodiment of this invention four such shear mount means are positioned between the longer walls 24 and 44 and 26 and 46 while two shear mount means 66 are positioned between the walls 30 and 50 and walls 28 and 48.

With the pallet thus assembled it will be seen that the inner frame 22 being suspended between the outer frame 20 it is free to move up and down or roll because of the shear strength possessed by the shear mount means 66. However, the distortion of the mount means 66 is not permanent and they will always return to the position illustrated in FIG. 4 due to the resilient qualities of the roller bodies 72.

The load carrying capacity of each of the shear mount means 66 may be predetermined, and the number of shear mount means 66 which should be used for a specific load may readily be determined. As an example, if the load to be carried upon the platform 58 is relatively light, having a relatively low center of gravity, normally some of the shear mount means 66 would be rendered inoperative by removal of the bolts 90 so that the load will be better able to move independent of the outer frame 20. However, the reverse situation is created when the load to be carried upon the platform 58 is relatively heavy. It is necessary therefore to have more of the shear mount means 66 in operation so that there is greater resistance to or stiffening of the movement of the suspense frame 22 caused by vibrations during transportation of the pallet or shocks which the pallet may sustain through bumping, dropping, etc.

As can readily be seen the position of the load on the platform 58 will also be a factor to consider in the engaging or disengaging of some of the shear mount means 66.

When the load to be carried upon the pallet is relatively tall, having a relatively high center of gravity, the inertia characteristics of the load will normally cause the suspense frame 22 to roll more than normal from the horizontal plane of the outer frame 20. In order to prevent unnecessary roll and movement of this type of load, there is provided a snubber assembly generally designated 94 and best seen in FIGURE 14. The assembly 94 comprises an elongated plate 96 which is mounted to a fixed surface 98, best seen in FIGURE 13, by means of bolts 100. The plate 96 extends the length or width, depending upon the position of the load, of the pallet between the skid blocks 38. Extending upwardly from the plate 96 are a pair of spaced apart generally parallel channel mounts 102 and 104 to which are secured one end of shear mount means 66 which project outward from the respective mounts 102 and 104 so that the roller body portion 72 will be slightly below the inturned lower flange 54 of the suspense frame 22.

Thus it will be seen that with the positioning of the snubber assembly 94 under the suspension frame 22 any unusual downward movement of the suspension frame 22 will be stopped by the respective shear mounts 66 and unnecessary or great swaying or rolling of the load on the pallet will be retarded. By using the resilient mounts 66 there will be some shear of the material within the roller body 72 and when the flanges 54 contact the roller 72 a sharp shock will not be imparted to the load on the platform 58.

To fasten a load to the platform 58, a strap 106 is passed over the cargo or load and suitably anchored to the platform 58 by means of a hook member 108 to which is secured the strap 106 through slot 110 in hook 108. The hook 108 is secured to the inner lower flange 54 of the suspense frame 22. It should be noted that the strap 106 and hook member 108 may be positioned anywhere around the periphery of the suspense frame 22 save for the space taken up by the shear mount means 66.

To secure the pallet 19 during transportation of the pallet and the load thereon, a plurality of tie down members 112 may be employed. The tie down members each comprise a plate having a first flat end surface 114 with a hole 116 therein, a middle portion 118 angled upwardly and away from end 114, and a second generally flat end portion 120 parallel with the end surface 114. At the end of the end portion 120 the member is turned inward forming a hook 122 which is adapted to engage the flange 34 of the outer or base frame 20. The vertical height of the members 112 correspond to the thickness of the skid blocks 38 or height of casters 130. A bolt 124 is passed through the opening 116 into the fixed surface 98. Thus, the outer frame 20 will be anchored and held to the fixed surface 98, allowing the inner frame 22 to remain suspended.

Figure 3:
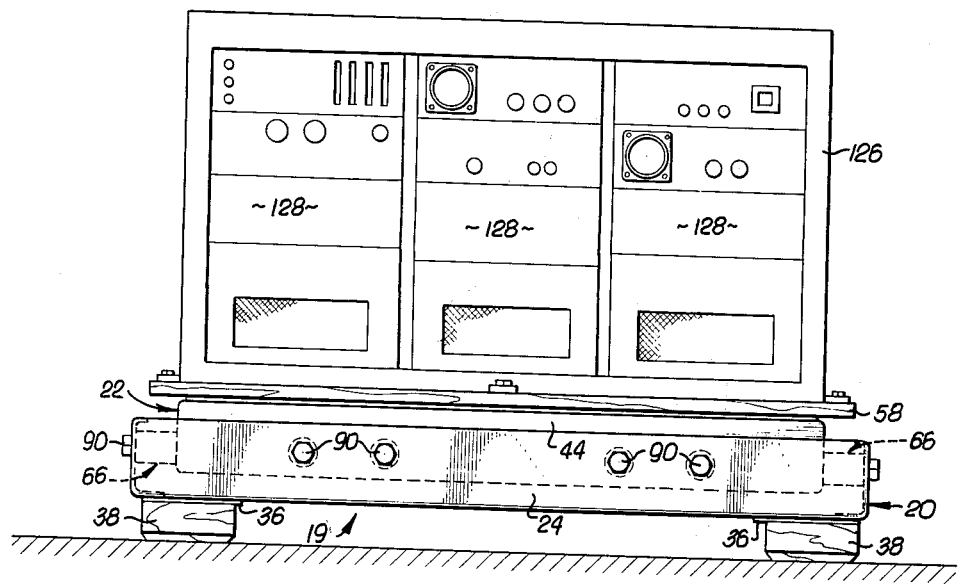
FIGURE 3 is a side elevational view of the pallet with a receptacle affixed thereon containing a load for storage and/or transportation.

The pallet and load illustrated in FIGURE 3 includes the same pallet 19 as shown in FIGURE 1, but incorporates the added feature of a cabinet or receptacle 126 which may be bolted to the platform 158 or formed as an integral part thereof. This cabinet 126 may be of any size to accommodate electronic equipment or other cargo 128 which is desired to be carried on the pallet. For additional shock absorbing technique the cabinet 128 may be padded on the inside with any type of material, such as rubber, cloth or cardboard. Where the exterior dimensions of the cargo 128 are known in advance a cabinet 126 may be constructed, as mentioned before, as an integral part of the platform 58, which will offer protection not only from dust and other foreign matter which, if allowed to penetrate certain types of cargo such as electronic apparatus, might cause serious damage thereto, but also the cabinet with padding gives additional shock damage protection.

The modified pallet 19' illustrated in FIGURES 9 through 12 comprise the base frame and suspense frame 20' and 22', as previously described, but differ from the pallet heretofore described in that casters 130 are secured to the gussets 36 instead of the skid blocks 38. By affixing the casters 130 to the pallet it will become mobile and may be transported from place to place without the necessity of a fork lift truck or other moving means. The casters 130 are of the conventional type which include a wheel and a locking assembly 132 to fix the caster in one position.

Additionally the pallet 19' is provided with a floor jack generally designated 134. The floor jack 134 extends downward from a support plate 136 which in turn is mounted to a base plate 138 affixed to the wall 30' of the outer frame 20' by means of the screws 90' passing through openings (not shown) in the plate 138 thence through the openings in the wall 30' to the shear mount means 66. The jack may be lowered so that the base 140 engages a floor or other fixed surface and raises one of the casters 130 off of the ground. In this way the pallet 19' will be locked as to transverse movement.

The base plate 138 is further provided with a pair of spaced sockets 142 adapted to receive a removable handle 144, which handle may be used to move the pallet 19' by hand. Additionally there is provided a hook receiving coupling means generally designated 146 which comprises a generally U-shaped support 148 affixed to the base plate 138 and a coupler plate 150 which is suspended from the U-shaped support 148 by two of the shear mount means 66'. These shear mount means 66' will act as shock absorbers when the coupling is engaged by a hook coupling such as illustrated in FIGURE 12 on the end of another pallet. The plate 150 is formed with an opening 160 which receives a hook to be described. A hook coupler generally designated 152 is mounted on the wall 28' opposite the coupling 146. It comprises a base plate 154 secured to the wall 28' similar to the plate 138, and a U-shaped support 156 secured to the plate 154 with a hooked bifurcated coupler bar 158 suspended from the support 156 by means of shear mounts 66". The hook 162 is adapted to engage the opening 160 of a similar pallet 19'.

Further, the plate 154 is provided with sockets 164 to receive a handle 166 similar to the handle 144.

With the construction of a pallet according to the teaching of this invention it will be seen that a cargo or load to be stored or transported upon the pallet 19 need not be centered upon the platform 58 nor be of a specific weight or height because the shear mount assemblies 66 are adapted to be engaged or disengaged dependent upon the inertia characteristics of the cargo placed upon the pallet. The shear mount assemblies 66 act to maintain the frame 22 in a quiescent position as well as in an agitated position, and further serve as shock absorbers to dampen shock from the outer frame 20 to the inner frame 22, which becomes quite critical when shipping or storing fragile equipment which may be easily damaged by a sudden shock. Further, should the load itself or the suspense frame 22 be hit or jarred, there will be a give of the frame 22 and load through the shear mounts 66 which will lessen possible damage to the load. Also, when the pallet is being transported normally there are vibrations which are created by the movement of the vehicle which will be transmitted through the skid blocks 38 or casters 130 to the outer frame 20, but will not be transmitted through the shear assemblies 66 to the inner frame by reason of the rubber or other elastic material forming the roller body 72.

It is to be understood that the forms of my invention herein shown and described are practical and preferred examples of the same and that changes may be resorted to within the scope of my invention which is not limited to the details disclosed herein but is to be accorded the full scope of the claims so as to embrace any and all equivalent structures.

Having described my invention, what I claim as new and desire to secure by Letters Patent is:

1. A load receiving pallet comprising a base frame of generally rectangular configuration adapted to be seated upon a surface and including upright side elements, load supporting pallet means primarily disposed within the perimeter of said side elements of said frame, and resilient suspension elements interconnecting each of said side elements with said supporting pallet means, each side element being connected to an opposed adjacent portion of said load supporting pallet means by a plurality of said suspension elements, said suspension elements possessing rigidity sufficient to sustain at a relatively mean elevation the supporting pallet means when loaded and the pallet is quiescent but resiliently yielding from the mean elevation when the pallet is agitated to floatingly sustain the supporting pallet means and dampen communication of shock from the frame to the supporting pallet means.

2. A load receiving pallet comprising a base frame of generally rectangular configuration adapted to be seated upon a surface and including upright side elements, load supporting pallet means primarily disposed within the perimeter of side elements of said frame, and resilient suspension elements interconnecting each of said side elements with said supporting pallet means, each side element being connected to an opposed adjacent portion of said load supporting pallet means by a plurality of said suspension elements, said suspension elements possessing rigidity sufficient to sustain at a relatively mean elevation the supporting pallet means when loaded and the pallet is quiescent but resiliently yielding from the mean elevation when the pallet is agitated to floatingly sustain the supporting means and dampen communication of shock from the frame to the supporting pallet means and each resilient suspension element including removable fastener means accessible from the exterior of said base frame to releasably hold said suspension elements in said supporting position, whereby certain of said fastening means can be removed to release a predetermined number of said suspension elements to adjust the load carrying capacity of said supporting pallet means.

3. The load receiving pallet of claim 1 including snubber means positioned in underlying relation with respect to said load supporting pallet means and engageable by said load supporting pallet means when said load supporting pallet means yields downward from the mean elevation upon agitation of the pallet.

4. The load receiving pallet of claim 3 wherein said snubber means comprises a plurality of resilient snubber elements anchored at one end only and disposed in a horizontal position in spaced relation above said surface with the other ends of the respective snubber elements underlying said load supporting pallet means, whereby when said load supporting pallet means yields downward from the mean elevation said snubber elements are engaged and shearingly yield to resiliently resist downward movement thereof.

5. A load receiving pallet as defined in claim 1 wherein said load supporting pallet means includes an inner frame having upright side elements, an annular inturned flange formed on the top of said upright side elements and a relatively flat load receiving platform secured to said flange.

6. The load receiving pallet of claim 5 wherein said base frame is constructed of inwardly facing channel members, said load supporting frame being disposed inwardly therefrom in closely spaced upwardly offset relation, and wherein said resilient supporting elements each comprise a resilient member having a concavity formed in either end thereof with a nut member fixed in each cavity for cooperation with bolts removably inserted through apertures in the respective frames.

References Cited in the file of this patent

UNITED STATES PATENTS

| | | |
|---|---|---|
| 758,114 | Shertzer | Apr. 26, 1904 |
| 1,812,861 | Chase | July 7, 1931 |
| 2,257,804 | Lord | Oct. 7, 1941 |
| 2,292,536 | McCabe | Aug. 11, 1942 |
| 2,947,565 | Wood | Aug. 2, 1960 |
| 2,971,768 | Ackley | Feb. 14, 1961 |
| 2,974,917 | Kappen | Mar. 14, 1961 |
| 2,998,141 | Moore | Aug. 29, 1961 |

FOREIGN PATENTS

| | | |
|---|---|---|
| 647,834 | Germany | July 14, 1937 |